ized Patent No.: US 10,372,768 B1

United States Patent
Lewis et al.

(10) Patent No.: US 10,372,768 B1
(45) Date of Patent: Aug. 6, 2019

(54) RANKING CONTENT USING SHARING ATTRIBUTION

(71) Applicant: Google Inc., Mountain View, CA (US)

(72) Inventors: Justin Lewis, Marina del Rey, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 380 days.

(21) Appl. No.: 14/587,706

(22) Filed: Dec. 31, 2014

(51) Int. Cl.
*G06F 16/00* (2019.01)
*G06F 16/9535* (2019.01)

(52) U.S. Cl.
CPC ................ *G06F 16/9535* (2019.01)

(58) Field of Classification Search
CPC ........... G06F 17/3053; G06F 17/30867; G06F 17/30648; G06F 17/30017; G06F 16/9535
USPC .......................................................... 707/727
See application file for complete search history.

(56) References Cited

U.S. PATENT DOCUMENTS

| | | | | |
|---|---|---|---|---|
| 7,958,127 | B2 * | 6/2011 | Edmonds | G06Q 30/02 707/748 |
| 9,152,675 | B2 * | 10/2015 | Faller | H04L 51/32 |
| 2006/0218187 | A1 * | 9/2006 | Plastina | G06F 17/30029 |
| 2008/0201348 | A1 * | 8/2008 | Edmonds | G06Q 30/02 |
| 2008/0275763 | A1 * | 11/2008 | Tran | G06Q 20/10 705/35 |
| 2009/0125382 | A1 * | 5/2009 | Delepet | G06F 17/30864 705/347 |
| 2009/0254499 | A1 * | 10/2009 | Deyo | G06Q 10/10 706/12 |
| 2009/0299824 | A1 * | 12/2009 | Barnes, Jr. | G06F 3/04847 705/7.39 |
| 2010/0153404 | A1 * | 6/2010 | Ghosh | G06F 17/30699 707/748 |
| 2011/0022602 | A1 * | 1/2011 | Luo | G06Q 10/10 707/748 |
| 2011/0145219 | A1 * | 6/2011 | Cierniak | H04L 67/42 707/709 |
| 2012/0233256 | A1 * | 9/2012 | Shaham | G06Q 30/02 709/204 |
| 2013/0097152 | A1 * | 4/2013 | Sommer | G06F 16/951 707/722 |
| 2014/0006415 | A1 * | 1/2014 | Rubchinsky | G07C 13/00 707/748 |
| 2014/0244660 | A1 * | 8/2014 | Lewis | G06F 17/30864 707/748 |
| 2016/0019298 | A1 * | 1/2016 | Brodie | G06F 16/9535 707/734 |

(Continued)

*Primary Examiner* — Thanh-Ha Dang
(74) *Attorney, Agent, or Firm* — Lowenstein Sandler LLP

(57) ABSTRACT

A method for ranking comments includes receiving a request for a media item; obtaining a plurality of comments associated with the media item; and for each of the plurality of comments, identifying an entity that provided a respective comment; and identifying an attribution score for the entity, the attribution score based on a quantity of responses attributed to a sharing message pertaining to the media item, the responses representing consumption of the media item. The method further includes determining ranking scores for the plurality of comments based on corresponding attribution scores; and providing the media item and at least a portion of the plurality of comments to be displayed in an order defined by the ranking scores.

20 Claims, 5 Drawing Sheets

(56) References Cited

U.S. PATENT DOCUMENTS

2016/0026713 A1\* 1/2016 Katic .................... H04L 67/104
707/709

\* cited by examiner

RANKING CONTENT USING SHARING ATTRIBUTION

TECHNICAL FIELD

This disclosure relates to the field of content-sharing platforms and, in particular, to ranking comments and search results.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, when a user is viewing a content item of the content sharing platform, the user may comment on the content item. Writing comments corresponding to a content item is the primary way for users to communicate back to the creator of the content item. Comments also allow users to communicate with each other around a specific topic (e.g., such as the content item in question). Often there are hundreds or thousands of comments and it may be difficult to find good or relevant comments.

There are many existing approaches to sorting, ranking, and showing comments and search results that are relevant to a user. For example, ranking algorithms may take into account how often users have "liked" a comment or viewed a search results. Another technique is to show the comments from people in a user's social network at the top. One other common approach is to display the comments from users that have published or commented on a large amount of content.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a method for ranking content (e.g., comments, media items) based on the influence of the entity that generated the content is disclosed. Such a method includes receiving a request for a media item; obtaining a plurality of comments associated with the media item; for each of the plurality of comments, identifying an entity that provided a respective comment; and identifying an attribution score for the entity, the attribution score based on a quantity of responses attributed to a sharing message pertaining to the media item, the responses representing consumption of the media item; determining ranking scores for the plurality of comments based on corresponding attribution scores; and providing the media item and at least a portion of the plurality of comments to be displayed in an order defined by the ranking scores.

In one implementation, the method further includes sorting the plurality of comments based on the ranking scores. The media item may be a video, the sharing message may comprise a link for accessing the video, and the link may comprise identification information for the video and identification information for the entity initiating the sharing message. In another implementation, the attribution score includes multiple attribution scores for the entity, a first score based on the quantity of responses attributed to the entity for the media item and a second score based on a quantity of responses attributed to the entity for multiple media items. The attribution score for the entity may be based on a duration of time the media item is consumed as a result of the sharing message In one implementation, the method may include analyzing a web log to determine the quantity of responses and indexing the attribution score based on an entity ID associated with the entity. In addition, the method may also determine the ranking score by personalizing the ranking score based on an entity viewing the content In additional implementations, computing devices for performing the operations of the above described implementations are also disclosed.

In some implementations, a computer readable storage media stores instructions for causing a processing device to perform the operations of the above described implementations.

BRIEF DESCRIPTION OF THE DRAWINGS

The present disclosure is illustrated by way of example, and not by way of limitation, in the figures of the accompanying drawings.

These drawings may be better understood when observed in connection with the following Detailed Description.

DETAILED DESCRIPTION

This disclosure includes methods and systems for ranking content based on the influence of the entity that generates the content. The entity's influence may be based on how successful the entity is at sharing one or more media items. For example, an entity (e.g., user) that is successful at sharing a media item may have the entity's content (e.g., comments, other media items) related to the media item ranked higher than the content of other entities that are not as successful at sharing the media item.

The entity's influence may be quantified by one or more sharing attribution scores. Each sharing attribution score may be calculated by summing the number of downstream responses that occur as a result of the entity's sharing messages. The sharing messages may include emails, posts, status updates and/or other similar messages and may provide information to identify a shared media item and information to identify the entity that initiated the sharing. In one example, a sharing message may include a link for accessing the shared media item. The link may include an attribution tag that may be used to identify the entity that initiated the sharing message. When other entities select or click on the link, a response (e.g., an indicator of a selection) may be logged in a log file. The log file may then be scanned and analyzed to identify the number of responses attributed to the entity and to calculate an attribution score for the entity, which may be subsequently indexed and stored.

When ranking content (e.g., comments, media item search results), the ranking system may utilize the attribution scores. The system may identify the entity associated with each content item and then retrieve the entity's attribution score from the index. The system may then incorporate this attribution score to generate a general ranking score. This process may be repeated for each content item and then the content items may be sorted based on the general ranking score and subsequently displayed. Utilizing an attribution score of the entity may be advantageous because it may provide an additional factor for ranking content, which prior ranking mechanisms may not account for. Another advantage of utilizing an entity's attribution score is that it may be available at the time a comment or media item is generated, where as other forms of historical information may not exist yet.

Frequently in this disclosure, examples directed to user-uploaded videos are presented. This is done for ease of explanation of some of the features described herein. However, embodiments with other content are also within the scope of this disclosure, regardless of whether specific examples of such are provided herein.

Figure 1:
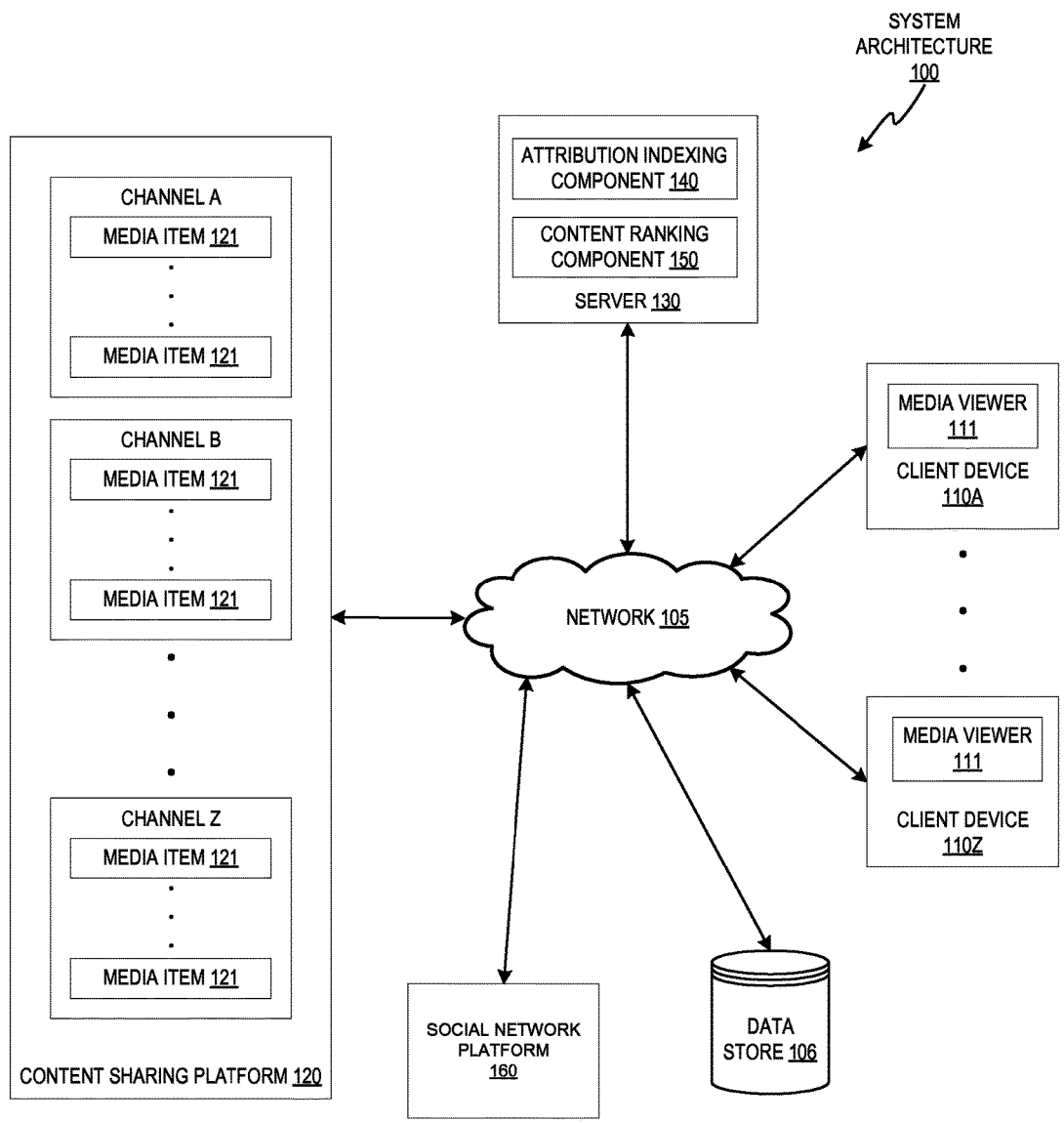
FIG. 1 illustrates an example system architecture, in accordance with an implementation of the disclosure.

FIG. 1 illustrates an example system architecture 100 for ranking content based on the content creator's sharing attribution (e.g., influence), in accordance with an implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or otherwise comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, content sharing platform 120 may store media items 121 using data store 106.

In one implementation, server 130 may be one or more computing devices (e.g., a rackmount server, a server computer, etc.). In one implementation, server 130 may be included in the content sharing platform 120. Server 130 may include an attribution indexing component 140 and a content ranking component 150. Attribution indexing component 140 may assess the influence of an entity by analyzing how often an entity's sharing invokes responses from other entities. Content ranking component 150 may analyze content, such as media item comments or search results, and rank the content in part based on the attribution sharing of the entity that generated the content.

In some implementations, attribution indexing component 140 and content ranking component 150 of server 130 may interact with content sharing platform 120 and/or with social network platforms 160 to provide implementations of the disclosure. Further description of the attribution indexing component 140, content ranking component component 150, and their functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed herein collect personal information about users, or may make use of personal information, the users may be provided with an opportunity to control whether the content sharing platform 120 can collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
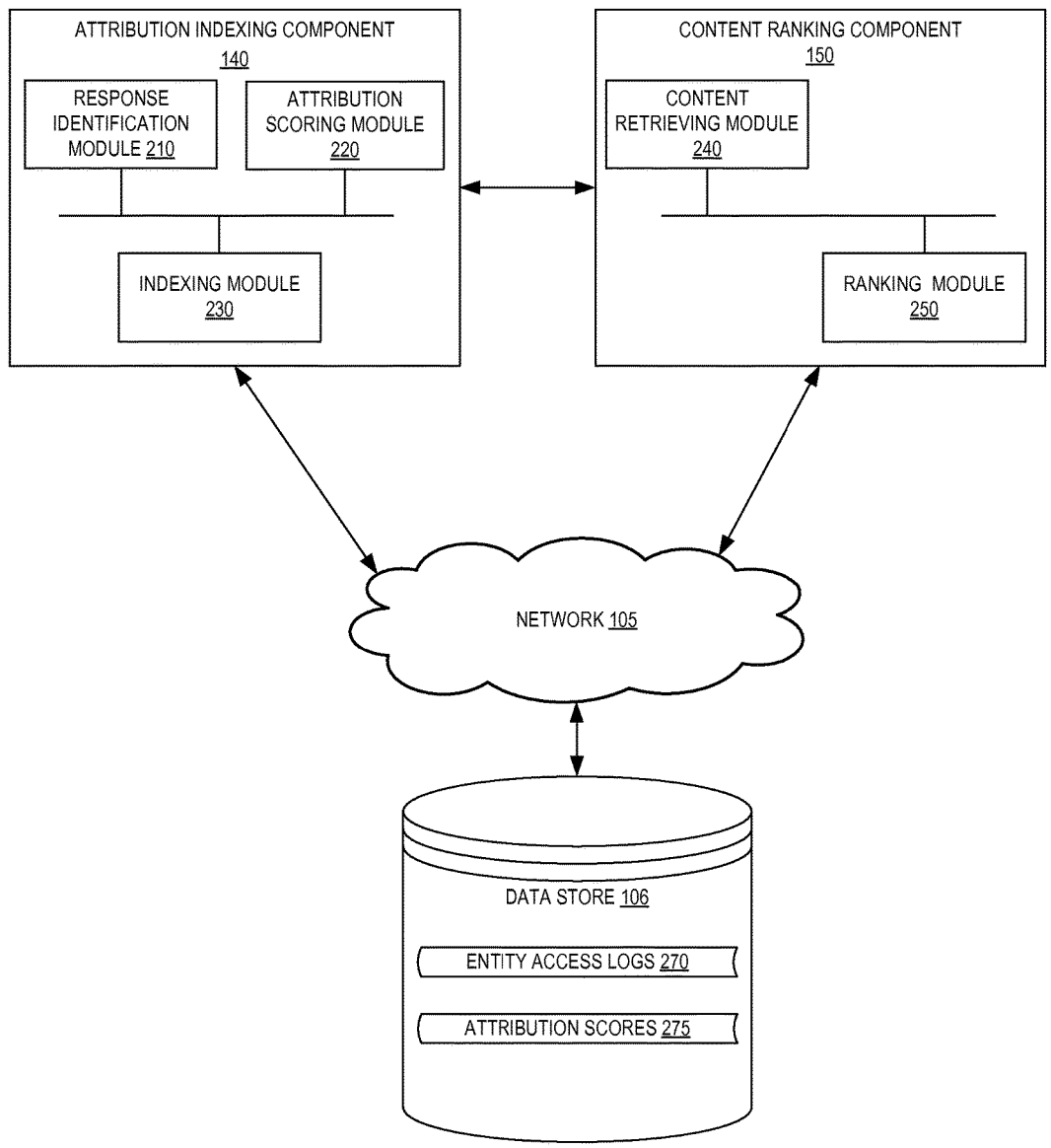
FIG. 2 is a block diagram illustrating an attribution indexing component and a content ranking component in accordance with one implementation of the disclosure.

FIG. 2 is a block diagram illustrating an attribution indexing component 140 and a content ranking component 150 in accordance with one implementation of the disclosure. In one implementation, the attribution indexing component 140 includes a response identification module 210, an attribution scoring module 220, and an indexing module 230. The content ranking component 150 may include a content retrieving module 240 and a ranking module 250. More or less components may be included in the attribution indexing component 140 and/or the content ranking component 150 without loss of generality. For example, two of the modules may be combined into a single module, or one of the modules may be divided into two or more modules. In one implementation, one or more of the modules may reside on different computing devices (e.g., different server computers).

The attribution indexing component 140 and the content ranking component 150 are communicatively coupled to the data store 106. For example, the attribution indexing component 140 and/or the content ranking component 150 may be coupled to the data store 106 via a network (e.g., via network 105 as illustrated in FIG. 1). In another example, the attribution indexing component 140 and/or the content ranking component 150 may be coupled directly to a server where the attribution indexing component 140 and/or the content ranking component 150 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes entity access logs 270 and attribution score 275.

As discussed above, attribution indexing component 140 may assess the influence of an entity by analyzing how often the entity's sharing invokes responses from other entities. An entity may share content by using a sharing message such as an email, a post, a status update, a text message (e.g., Simple Message Service (SMS)), a multimedia message (e.g., Multimedia Messaging Service (MMS)) or other similar message. The sharing messages may be internal to content sharing platform 120 or may be external to content sharing platform 120 such as a post or message on a social network platform 160.

The sharing messages may be initiated by the entity or on behalf of the entity and may be sent to one or more entities identified by the entity. The entity may identify the entities by selecting specific entities or by selecting specific groups in which the entity may be a member. For example, the user may elect to send a sharing message to all friends, family and/or fans (e.g., the user's contacts on a social network platform), at which point a sharing message may be automatically generated and transmitted to the appropriate entities or social network platform. The sharing message may include identification information that identifies the content being shared (e.g., media item) and identification information to allow the system to identify the entity sending the sharing message. In one example, a user may access social network platform 160 and utilize tools provided by the social network platform 160 (e.g., web application, smartphone application) to generate a sharing message. The sharing message may include a link to a media item hosted by content sharing platform 120. Another user of the social network platform 160 may then select the link once published and may navigate to content sharing platform 120 where the media item may be displayed. In another example, the user of the social network platform 160 may select the link and the media item may be displayed while embedded amongst other content provided by the social network platform 160.

Response identification module 210 may analyze sharing responses to determine the downstream traffic generated as a result of the entities sharing. Identifying the quantity of responses attributed to an entities sharing may be based on many different mechanisms. In one example, the mechanism may utilize attribution tags that are included within a sharing message. The attribution tag may provide information that may be used by response identification module 210 to identify the entity that initiated the sharing message. The attribution tag may comprise a randomly generated token that is included (e.g., embedded, appended) within a link (e.g., URL). The link may then be used to access a media content, for example a user may click on a URL to view a video, at which point the entity identification information (e.g., token) and/or target location may be stored in entity access log 270.

Entity access logs 270 may include one or more logs that store multiple entries corresponding to each time an entity accesses a media item via a shared message. Entity access logs 270 may include entries for any entity accessing any media item through any sharing message. In addition, entity access logs 270 may include entries corresponding to accesses not resulting from the shared message, such as when an entity accesses the content sharing platform directly to view media items.

Response identification module 120 may scan and analyze entity access logs 270 to determine which log entries correspond to which sharing entities. The scanning and analysis may occur periodically for example, every minute, 5 minutes, 15 minutes, hour, day, week or other similar duration of time. During the analysis, response identification module 210 may accumulate statistical data including, for example, the number of entities that accessed a media item, the number of times the media item was accessed by an entity, the duration of time during which the entity consumed the media item, the number of media items an entity accessed, how the entity accessed the media item, where the entity's access originated from, for example, from an external source such as a third party service (e.g., social network, search engine) or from an internal source such as linking from another media item or searching performed internal to content sharing platform 120.

In another example, response identification module 210 may process the responses at the time an entity responds, as opposed to logging the response and subsequently updating the respective attribution score. This may result in statistics that are more current, however this may delay access to the media item and thus may not perform as fast as the logging method discussed above.

Attribution scoring module 220 may utilize the analysis performed by response identification module 210 to generate attribution scores. Attribution scores may be associated with a specific entity and may indicate the influence the entity has with respect to other entities. An attribution score may be a value (e.g., integer, decimal, ratio) that corresponds to the quantity of responses received as a result of the entities sharing. The result may be a direct or indirect result of the entity's sharing, wherein a direct result may occur when the sharing message is sent to the entity that subsequently responds and an indirect result may occur when the sharing message has been re-shared or re-directed to another entity that subsequently responds. Determining the quantity of responses may involve summing up all of the responses pertaining to a media item.

A single entity may be associated with a set of attribution scores. The set may include multiple types of attribution scores and each type of score may have a different scope or granularity. The set of attribution scores may include X attribution score types (wherein X is an integer value such as 2, 3, 4, 5 or greater value). In one example, there may be three attribution types of varying scope. A first type may correspond to a specific media item, the second type may correspond to all media items on a channel (e.g., multiple channels), and the third type may correspond to all media items on the content sharing platform. As such, the first attribution score type may be calculated by summing the responses to a specific media item. The second attribution score type may be calculated by summing the responses for any media item on the channel. The third attribution score type may be calculated by summing the responses for any media item hosted by the content sharing platform 120. The third type may have a broader scope than the first and second types. Conversely, the first type may be more granular than the second and third types.

Indexing module 230 may collaborate with attribution scoring module 220 to retrieve and store attribution scores 275 in data store 106. Indexing module 230 may receive scores from module 220 and may store the scores in a manner that allows for quick and efficient retrieval at a later time. In one example, the attribution scores may be indexed based on an entity ID. The entity ID may be based on the user name, user ID, a universally unique identifier (UUID) and/or some other similar identification information. This may allow content ranking component 150 and its constituent modules to access one or more attribution scores associated with an entity.

As shown in FIG. 2, content ranking component 150 may analyze content and rank the content in part based on information received from attribution indexing component 140. Content ranking component 150 may include content retrieving module 240, ranking module 250 and personalization module 260. The content being ranked may include comments, posts, reviews, tweets, media items or other user generated content. Once the content has been ranked, the content may be displayed, for example, as a list of comments below a media item or as search results (e.g., list of media items associated with a search query) in accordance with the ranking.

Content retrieving module 240 may access data store 106 to fetch content to be ranked. The content retrieving module 240 may analyze the content (e.g., comments) and determine the entity (e.g., entity ID) that generated or published the content. The content retrieving module may then interact with attribution indexing component 140 to retrieve the attribution scores using the entity as the key. Content retrieving module 240 may then transfer the content and the respective attribution scores to ranking module 250.

Ranking module 250 may then analyze the content and the attribution scores as well as multiple other factors to determine a general ranking score for each content item. The general ranking score may be determined using a ranking algorithm which may take into account a variety of factors, such as, the relationship between the entity generating the content and a viewing entity; the engagement of viewing entities with the content, the general popularity of the entity that generated the content, and the relevance of the entity and the content (e.g., comment) to a media item being viewed.

In addition to the above factors, the ranking algorithm may utilize attribution scores 275. The ranking module 250 may incorporate attribution scores 275 by multiplying an attribution score by a weighting factor. In one example, the weighting factor is an optimized value that is discovered via a machine learning algorithm which may be optimized for user engagement with content. One advantage of this is that it allows the ranking algorithm to appropriately weight the entities influence compared to other factors. If the machine learning determines that this factor has a strong correlation to viewer interest the optimized value may be larger, if there is less of a correlation the optimized value may be lower.

A single entity may correspond to a set of attribution scores, as discussed above, and this set may have a corresponding set of weighting factors. Each attribution score in the set of attribution scores may indicate the entity's influence at different scopes or granularities (e.g., specific video, all videos on a channel, all videos across all channels) and for each of these scores a different weighting factor may be used.

An advantage of having varying weighting factors is that the attribution score (e.g., influence) that has the narrowest scope (e.g., most granular), such as the attribution score specific to the media item, may be emphasized more than the entity's attribution factor that corresponds to the broadest scope, such as for all media items. For example, if an entity adds a comment for a video it may be advantageous to rank the comment by taking into account the entity's influence in sharing that specific video more than the entity's sharing influence for videos on other channels, although each may be useful for ranking the comment.

In one example, there may be an inverse relationship between the scope of the attribution score and the weighting factor, such that the larger the scope of the attribution value (e.g., all videos vs specific video) the smaller the weighting factor. As such, the weighting factor for the broadest scope (e.g., all videos) may be smaller than the weighting factor for the narrowest scope (e.g., specific video). In contrast, there is a direct relationship between the granularity and the size of the weighting factor, such that, the more granular the attribution score (video vs all videos) the larger the weighting factor.

Ranking module 250 may also personalize the content ranking based on the entity viewing the content. This may be done in order to increase the probability the viewing entity would find the content interesting. This may be implemented by building a knowledge graph to of the entity's interactions with other entities. This may be used to detect social relationships and quantify the strength of the relationships. In one example, the quantity of interactions can be multiplied by a weighting factor and factored into the ranking algorithm similar to the attribution scores discussed above.

Ranking module 250 may also de-spam the rankings to remove or demote the rank of content that is determined to be spam. This may involve analyzing the substance of the content and/or the entity generating the content. For example, if a comment has been published by an entity that has been determined to be a spammer and the comment includes text and images that are unrelated to the media item, the general ranking score of the content can be demoted (e.g., decrease score or, remove from results).

Figure 3:
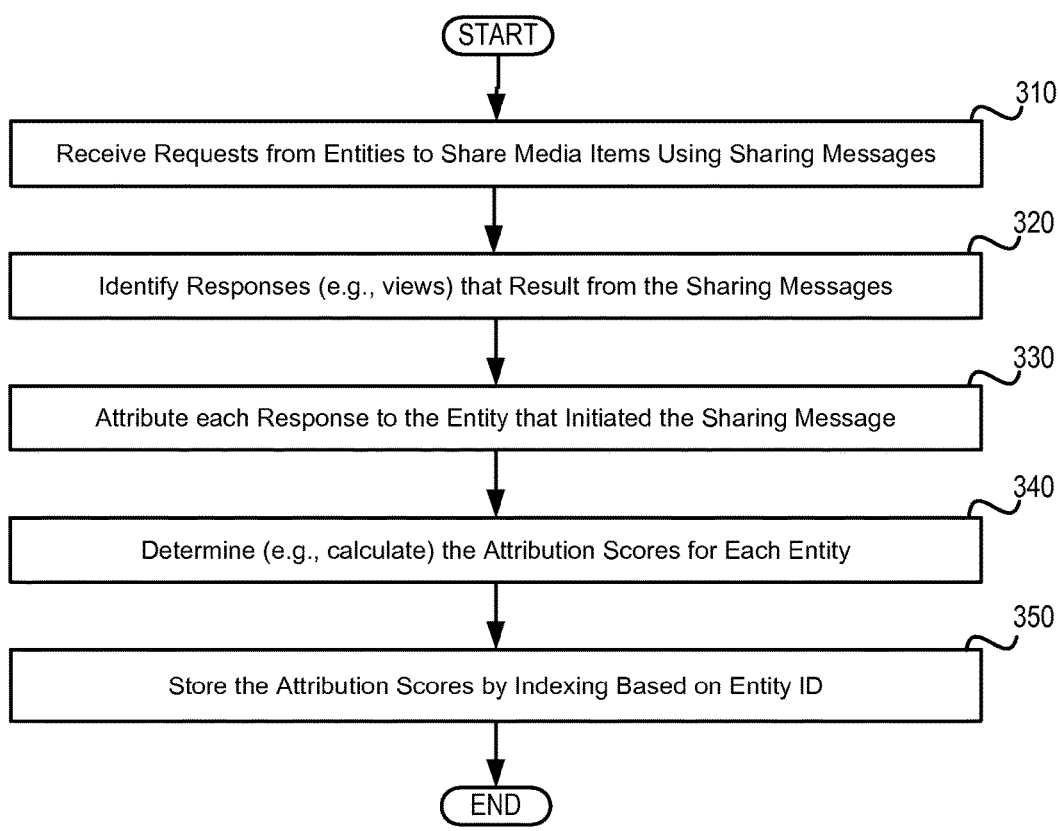
FIG. 3 is a flow diagram illustrating an example of an attribution indexing method in accordance with some implementations of the disclosure.

FIG. 3 is a flow diagram illustrating a method 300 for determining and storing attribution scores 275 for an entity. The method 300 may be performed by processing logic that comprises hardware (e.g., circuitry, dedicated logic, programmable logic, microcode, etc.), software (e.g., instructions run on a processing device to perform hardware simulation) or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by attribution indexing component 140 as shown in FIGS. 1 and 2.

Referring to FIG. 3, at block 310 method 300 receives requests from entities to share media items using sharing messages. In one example, the sharing messages may be posts from a third party social network service. The posts may include a link for accessing a media item that includes a token to identify the entity that initiated the sharing message.

At block 320, the processing logic may identify responses (e.g., views, referrals) that result from the sharing messages. This may involve periodically scanning weblogs to determine what entities have accessed the media item and where there access originated. For example, some accesses may originate from a sharing message and others may originate from another source, such as an entity accessing the content sharing platform directly and executing a search.

At block 330, the processing logic may attribute each response to the entity that initiated the sharing message. This may involve locating all the responses that were a result of sharing messages by this entity. This may be the results of multiple separate sharing messages for multiple different media items.

At block 340, the processing logic may determine (e.g., calculate) attribution scores for each entity. There may be multiple attribution score types having varying scope/granularity and they may be grouped together in an attribution score set. A first attribution score type may be specific to the entity's influence as it relates to a specific media item. As such, calculating the scores may involve summing the responses to any sharing message initiated by the entity that resulted in an access to the specific media item.

A second attribution score type may be specific to the entities influence as it relates to the channel hosting the specific media item. This attribution score may be calculated by summing the responses to the specific media item and all other media items hosted by the channel. (e.g., published by the same channel host). A third attribution score type may be specific to the entity's influence as it relates to the content sharing platform hosting the specific media item. This attribution score may be calculated by summing the responses to the specific media item and all other media items hosted by the content sharing platform.

At block 350, the processing logic may store the attribution scores by indexing the scores based on the entity ID. The scores may be stored locally on the machine executing attribution indexing component 140 or may be stored on a remote data store. The data structure used for storing the attribution scores may support key value pairs in which the key may be based on the entity ID.

Figure 4:
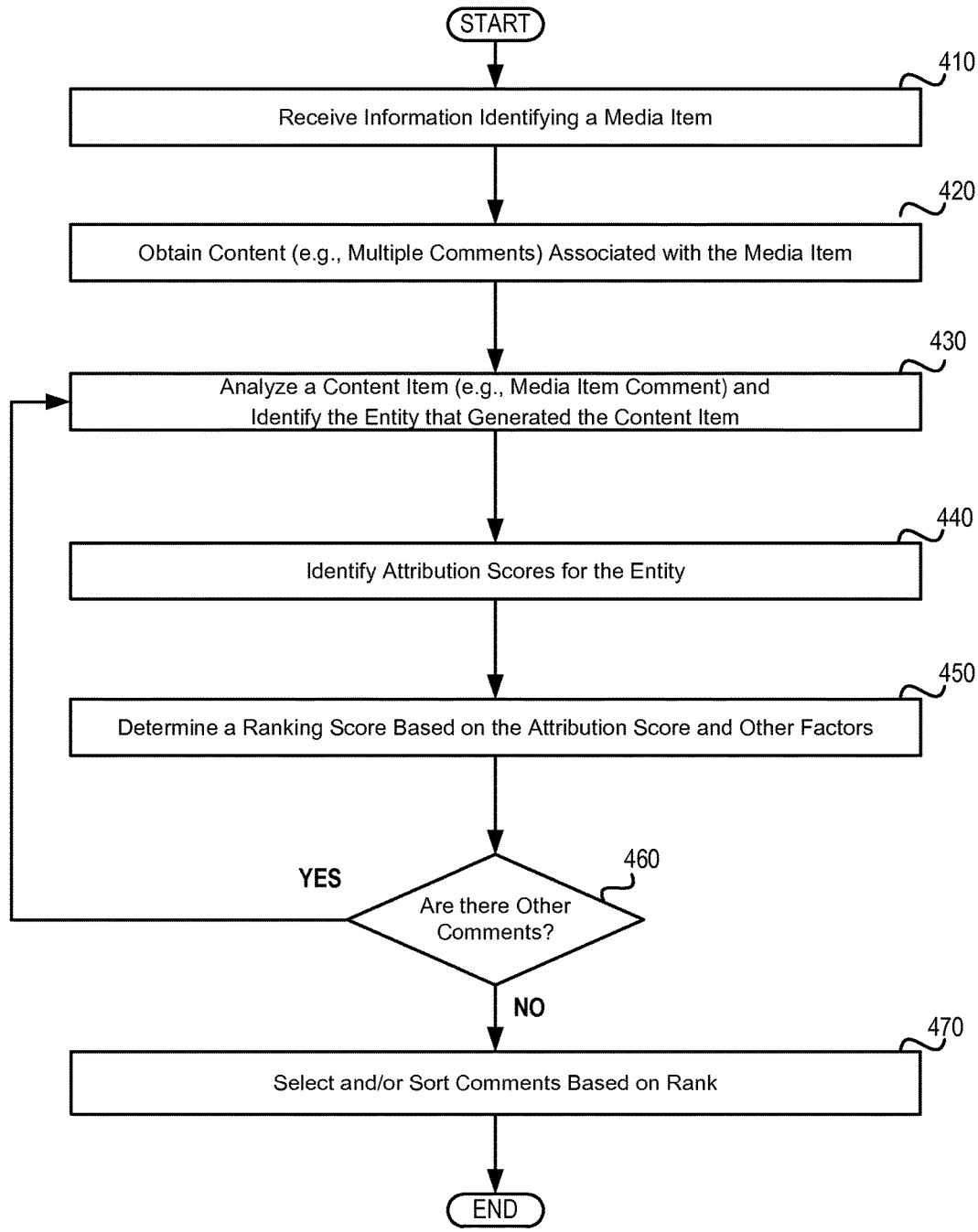
FIG. 4 is a flow diagram illustrating an example of a content ranking method according to some embodiments of the disclosure.

FIG. 4 is a flow diagram illustrating method 400 for ranking content based on the attribution scores (e.g., influence) of the entity generating the content. In one example, the attribution scores may be calculated and indexed according to method 300 of FIG. 3 described above. Method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by content ranking component 150, as shown in FIGS. 1 and 2.

Referring to FIG. 4, method 400 may begin at block 410 when the processing logic receives a user request for a media item or a user request to search for content. For example, the user request may a URL or title of a media item, or keywords associated with the content. Then at block 420, the processing logic may obtain multiple comments associated with the media item or multiple search results satisfying the keywords.

At block 430, the processing logic may select a comment or a search result including a media item, and analyze it to identify the entity that provided the commend or the media item from the search result. Then at block 440, the processing logic may identify one or more attribution scores associated with the entity. This may include querying the attribution indexing mechanism discussed above.

At block 450, the processing logic may determine a ranking score based on that attribution score, amongst other factors. This may include executing a ranking algorithm that utilizes weighting factors to appropriately weight each factor to increase the probability that a resulting content ranking score would accurately predict the interest of a viewing entity.

At block 460, the processing logic may determine if there are any other comments associated with the requested media item or any other search results satisfying the search request. If there are, it may branch to block 430 to analyze the next comment or search result. Otherwise, it may determine that all comments or media items from search results have been ranked. Lastly, at block 470, the comments or search results may be provided to a client. In one implementation, the comments or search results can be selected and/or sorted based on their rank. Alternatively, the ranking may be provided for use by a client, for example, provided to a client device for display. In one example, the requested media item may be provided to the client with at least some comments for display in the order defined by their rank. In another example, at least some search results may be provided to the client for display in the order defined by their rank.

Figure 5:
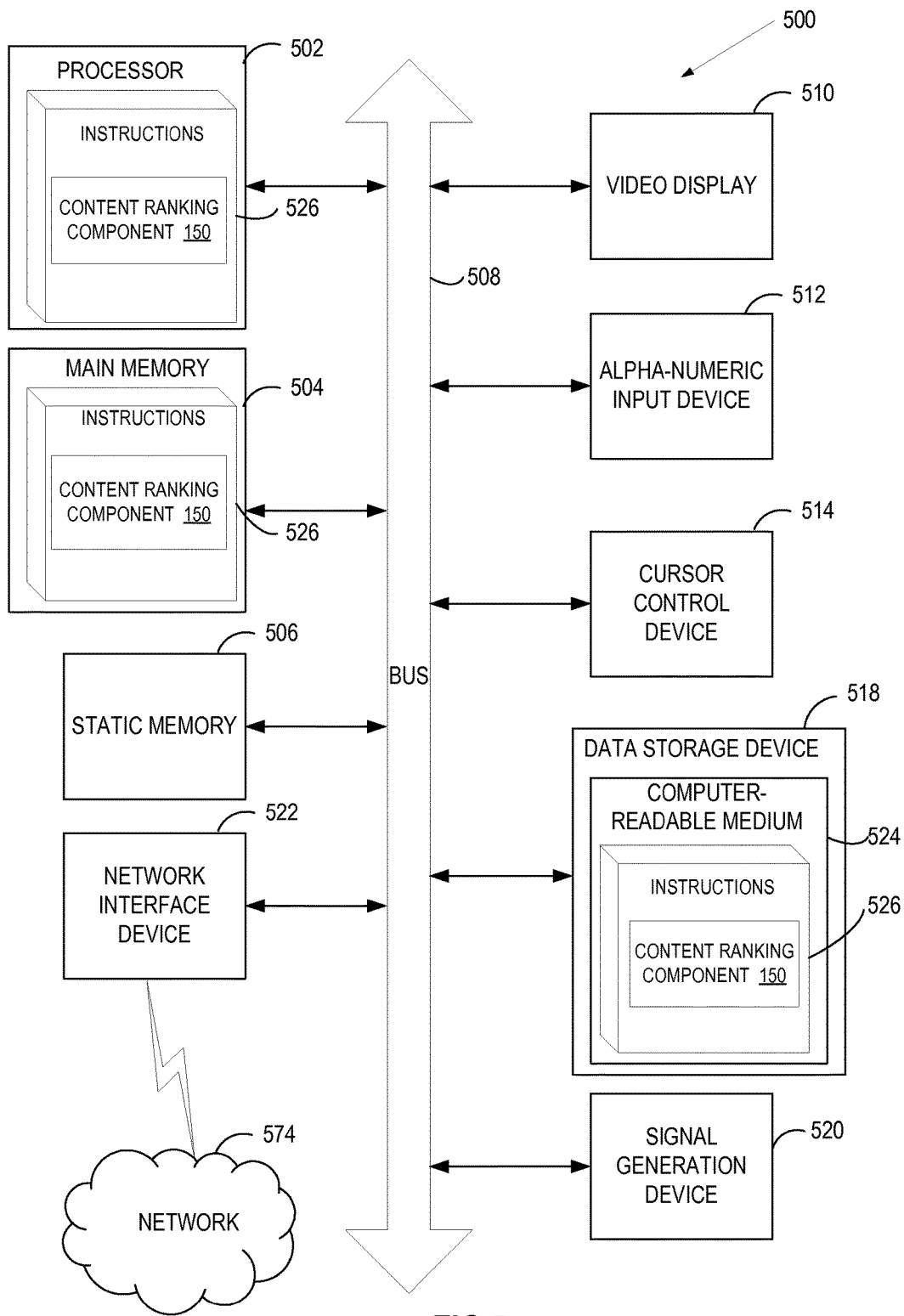
FIG. 5 is a block diagram illustrating an example system architecture, according to some implementations of the disclosure.

FIG. 5 illustrates a diagrammatic representation of a machine in the exemplary form of a computer system 500 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like, having one or more cores. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein. For example, the processor 502 may execute instructions 526 to perform method 300 as shown herein in FIG. 3.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a physical keyboard or a virtual keyboard), a cursor control device 514 (e.g., a mouse), and a signal generation device 520 (e.g., a speaker).

The data storage device 518 may include a non-transitory computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one embodiment, the instructions 526 include instructions for providing content ranking component 150 or other features which may correspond, respectively, to identically-named counterparts described with respect to FIG. 1 and/or a software library containing methods for displaying content in between loops of a looping media item. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "monitoring", "determining", "receiving", "identifying", "generating", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
obtaining a plurality of comments associated with a media item, wherein the media item is provided by a first entity;
identifying a second entity that provided one or more comments of the plurality of comments, wherein the second entity is different from the first entity and comprises at least one user;
determining, by a processing device, an attribution score of the second entity, the attribution score being based on a number of responding entities that are attributed to a sharing message of the second entity and consume the media item, wherein the sharing message comprises a link to consume the media item;
determining, by the processing device, rankings for the one or more comments based on the attribution score of the second entity; and
providing the media item and at least a first comment and a second comment of the plurality of comments to be displayed in an order defined by the rankings, wherein the first comment is by the second entity and is ranked higher than the second comment that is by an entity with an attribution score that is smaller than the attribution score of the second entity.

2. The method of claim 1 further comprising, sorting the plurality of comments based on the rankings.

3. The method of claim 1, wherein the media item comprises a video, and wherein the link comprises identification information for the video and identification information for the second entity initiating the sharing message.

4. The method of claim 1, wherein the attribution score includes multiple attribution scores for the second entity, a first score based on a quantity of responses attributed to the second entity for the media item and a second score based on a quantity of responses attributed to the second entity for multiple media items, wherein each of the responses represents a consumption of a respective media item.

5. The method of claim 1, wherein the attribution score for the second entity is based on a duration of time the media item is consumed as a result of the sharing message.

6. The method of claim 1, further comprising:
analyzing, by the processing device, a web log to determine the number of responding entities that consume the media item and are attributed to the second entity, wherein the web log comprises an entry indicating one of the responding entities accesses the media item using the sharing message of the second entity; and indexing the attribution score based on an entity ID associated with the second entity.

7. The method of claim 1, wherein determining the rankings comprises personalizing the rankings based on a requestor of the media item.

8. A non-transitory computer-readable storage medium comprising instructions to cause a processing device to:

obtain a plurality of comments associated with a media item, wherein the media item is provided by a first entity;

identify a second entity that provided one or more comments of the plurality of comments, wherein the second entity is different from the first entity and comprises at least one user;

determine, by the processing device, an attribution score of the second entity, the attribution score being based on a number of responding entities that are attributed to a sharing message of the second entity and consume the media item, wherein the sharing message comprises a link to consume the media item;

determine, by the processing device, rankings for the one or more comments based on the attribution score of the second entity; and provide the media item and at least a first comment and a second comment of the plurality of comments to be displayed in an order defined by the rankings, wherein the first comment is by the second entity and is ranked higher than the second comment that is by an entity with an attribution score that is smaller than the attribution score of the second entity.

9. The non-transitory computer-readable storage medium of claim 8, wherein the instructions further cause the processing device to sort the plurality of comments based on the rankings.

10. The non-transitory computer-readable storage medium of claim 8, wherein the media item comprises a video, and wherein the link comprises identification information for the video and identification information for the second entity initiating the sharing message.

11. The non-transitory computer-readable storage medium of claim 8, wherein the attribution score includes multiple attribution scores for the second entity, a first score based on a quantity of responses attributed to the second entity for the media item and a second score based on a quantity of responses attributed to the second entity for multiple media items, wherein each of the responses represents a consumption of a respective media item.

12. The non-transitory computer-readable storage medium of claim 8, wherein the attribution score for the second entity is based on a duration of time the media item is consumed as a result of the sharing message.

13. The non-transitory computer-readable storage medium of claim 12, wherein determining the rankings comprises personalizing the rankings based on a requestor of the media item.

14. The non-transitory computer-readable storage medium of claim 8, further comprising:

analyzing a web log to determine the number of responding entities; and indexing the attribution score based on an entity ID associated with the second entity.

15. A system comprising:

a memory; and a processing device communicably coupled to the memory, the processing device to:

obtain a plurality of comments associated with a media item, wherein the media item is provided by a first entity;

identify a second entity that provided one or more comments of the plurality of comments, wherein the second entity is different from the first entity and comprises at least one user;

determine an attribution score of the second entity, the attribution score being based on a number of responding entities that are attributed to a sharing message of the second entity and consume the media item, wherein the sharing message comprises a link to consume the media item;

determine ranking scores for the one or more comments based on the attribution score of the second entity; and provide the media item and at least a first comment and a second comment of the plurality of comments to be displayed in an order defined by the ranking scores, wherein the first comment is by the second entity and has a larger ranking score than the second comment that is by an entity with an attribution score that is smaller than the attribution score of the second entity.

16. The system of claim 15, wherein the instructions further cause the processing device to sort the plurality of comments based on the ranking scores.

17. The system of claim 15, wherein the media item is a video, and wherein the link comprises identification information for the video and identification information for the second entity initiating the sharing message.

18. The system of claim 15, wherein the attribution score includes multiple attribution scores for the second entity, a first score based on a quantity of responses attributed to the second entity for the media item and a second score based on a quantity of responses attributed to the second entity for multiple media items, wherein each of the responses represents a consumption of a respective media item.

19. The system of claim 15, wherein the attribution score for the second entity is based on a duration of time the media item is consumed as a result of the sharing message.

20. The system of claim 15, wherein the instructions further cause the processing device to:

analyze a web log to determine the number of responding entities that consume the media item and are attributed to the second entity, wherein the web log comprises an entry indicating one of the responding entities accesses the media item using the sharing message of the second entity; and index the attribution score based on an entity ID associated with the second entity.

* * * * *